United States Patent [19]

Kobayashi et al.

[11] Patent Number: 4,670,796
[45] Date of Patent: Jun. 2, 1987

[54] ROTARY HEAD TYPE PCM RECORDER

[75] Inventors: Masaharu Kobayashi; Takaharu Noguchi; Takao Arai; Michio Masuda; Yasufumi Yumde, all of Yokohama, Japan

[73] Assignee: Hitachi, Ltd., Tokyo, Japan

[21] Appl. No.: 625,235

[22] Filed: Jun. 27, 1984

[30] Foreign Application Priority Data

Jun. 29, 1983 [JP] Japan .................................. 58-115866
Jun. 29, 1983 [JP] Japan .................................. 58-115867

[51] Int. Cl.⁴ ........................ H04N 9/79; H04N 5/782
[52] U.S. Cl. ...................................... 358/310; 360/19.1; 360/32
[58] Field of Search ............... 358/310, 312; 360/10.3, 360/32, 33.1, 19.1, 64, 84

[56] References Cited

U.S. PATENT DOCUMENTS

| | | |
|---|---|---|
| 4,295,154 | 10/1981 | Hata et al. ........................... 360/19.1 |
| 4,329,708 | 5/1982 | Yamamoto et al. ................. 358/310 |
| 4,390,906 | 6/1983 | Furumoto et al. ................. 360/19.1 |
| 4,462,049 | 7/1984 | Heitmann ........................... 360/10.3 |
| 4,463,307 | 7/1984 | Hashimoto et al. ................ 358/310 |
| 4,468,710 | 8/1984 | Hashimoto et al. ............... 360/19.1 |
| 4,488,182 | 12/1984 | Takahashi et al. ................. 358/310 |
| 4,533,963 | 8/1985 | Nakano et al. ..................... 360/19.1 |
| 4,580,180 | 4/1986 | Murakoshi .......................... 360/84 |

Primary Examiner—Donald McElheny, Jr.
Attorney, Agent, or Firm—Antonelli, Terry & Wands

[57] ABSTRACT

The recording area of the magnetic tape is divided into a first area for recording a PCM converted audio signal and a second area for recording a PCM converted video information. In recording the audio signal and the video information which have been separately PCM converted, the magnetic tape is wrapped around the rotary heads so that a wrap angle of each of said first and second areas is less than 90° with respect to the rotary heads of a predetermined diameter.

7 Claims, 14 Drawing Figures

ROTARY HEAD TYPE PCM RECORDER

The present invention relates to an apparatus for adding video information to an audio signal in a rotary head type PCM recorder which records by using a rotary head a PCM converted audio signal on a magnetic tape, and in particular to a rotary head type PCM recorder suitable for recording and reproducing video information as well as audio signals.

Due to the need for higher quality of the audio equipment, the techniques of recording on and reproducing from a magnetic tape or a rotary disk medium in the PCM fashion have been improved, and products have also become available. Further, due to the recent trend of variety in information utilization, there is an increased need for recording and reproducing high quality audio information and associated high quality video information accompanied therewith on the same medium.

However, in the prior art, no products, media or techniques have been existed to meet these requirements. As a close system, an 8 mm video system among the VTRs has been known in which an audio signal is recorded in the PCM fashion.

However, since the video information area on the magnetic tape occupies a 180° area as expressed by a wrap angle of the magnetic tape around the cylinder, the after recording can not be achieved in which during the reproduction of the image information, an audio signal or another video information is recorded on the same magnetic tape on the spot, or in which during the reproduction of the audio signal, video information or another audio signal is recorded.

Furthermore, in the rotary head type PCM recorders which are primarily intended to record and reproduce the audio sound signal, the recording area of the video information is inherently restricted as compared with the audio signal recording area, and hence it is necessary to process the video information after it has once been stored in a memory.

An object of the present invention, in view of the drawbacks mentioned above, is to provide a rotary head type PCM recorder which is capable of after-recording of, in addition to a first audio signal or first video information, second video information or a second audio signal on one and the same recording medium with the first audio signal or first video information being reproduced from the recording medium.

The term "second video information" means pictures, animations, any kinds of graphics or the like which may be related to the first audio signal or video information, while the term "second audio information" means any kinds of audio signals which may be related to the first audio signal or video information.

According to one aspect of the present invention, both the first audio signal or video information and the second video information or audio signal are PCM converted, and the recording area is divided into one for the former and one for the latter and they are recorded on the separate (divided) areas each of which occupies an angular span of less than 90° in terms of wrap angles with respect to rotary head means or assembly.

In the following description of some preferred embodiments of the present invention, it is exemplarily assumed that in addition to a first audio signal second video information is after-recorded with the first audio signal being reproduced.

Figure 12:
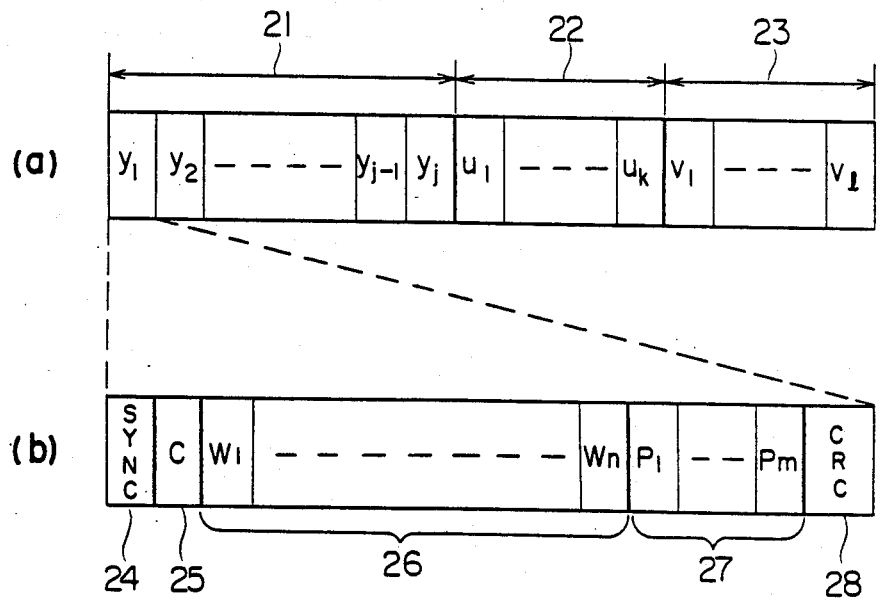
Figure 13:
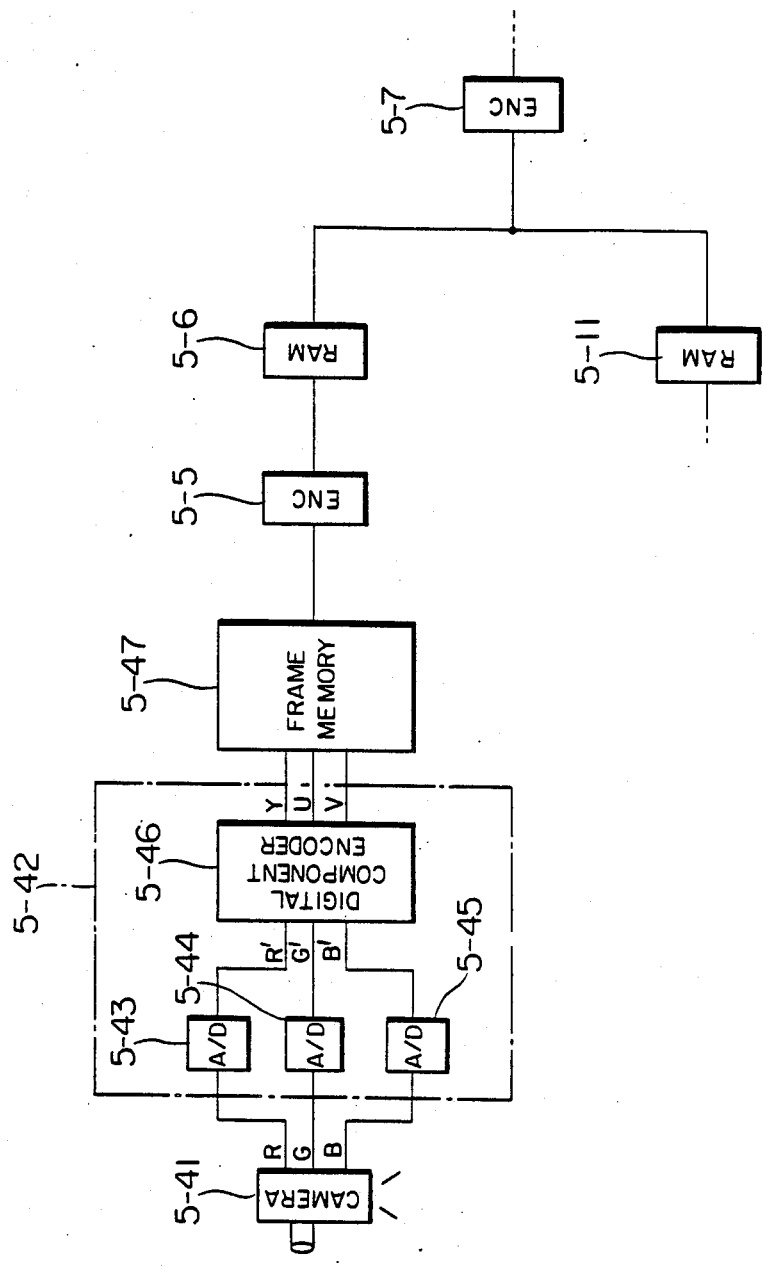

FIG. 12, consisting of (a) and (b), is a line format diagram and a block format diagram according to the present invention; and FIG. 13 is a block diagram of a recording system according to the present invention.

Figure 1:
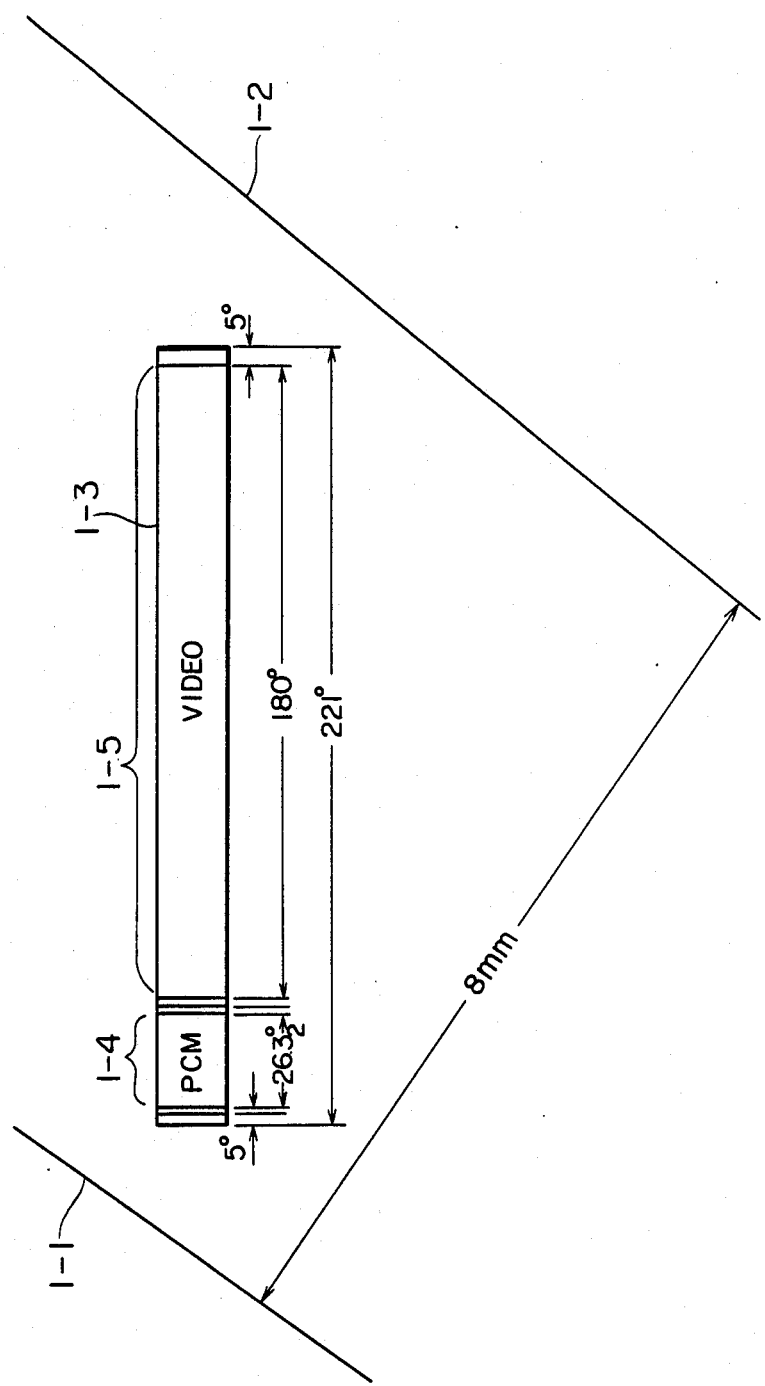
FIG. 1 is a tape format diagram for an 8 mm video system.

Referring to FIG. 1, there is shown a tape format for an 8 mm video system. The reference numerals 1-1 and 1-2 respectively indicate both edges of a magnetic tape, and the content of one track is arranged as shown at 1-3. In this one track 1-3, an audio PCM signal is recorded on an area 1-4, and video information is recorded on an area 1-5. In this case, the video information is constituted by an FM modulated analog signal of one field recorded on one track. In FIG. 1, the angle values respectively indicate spans of various portions in the NTSC format represented by wrap angles of the magnetic tape around the cylinder.

In FIG. 1, the magnetic tape is wrapped around the rotary head (not shown) over a span of 221°, and in this span, the video information is recorded in an area 1-5 of 180°. This video information is recorded by the low frequency band conversion chrominance signal recording system which is the basic recording system for home VTRs. In other words, the luminance signal is FM modulated by using a carrier of 4.2–5.4 MHz, and the color subcarrier is converted to a low frequency of about 740 kHz, and both are recorded by frequency multiplex recording.

Further, the PCM sound signal is processed for a predetermined noise reduction, and is sampled with a frequency twice the frequency of the horizontal sync signal, and the resultant digital signal of $10^5$ bits is compressed to a 8 bit signal. The compressed signal is recorded on an area 1-4 of 26.3°.

However, as described in the foregoing, the after recording in which recorded information or signals is monitored can not be achieved in the 8 mm video system.

Figure 2:
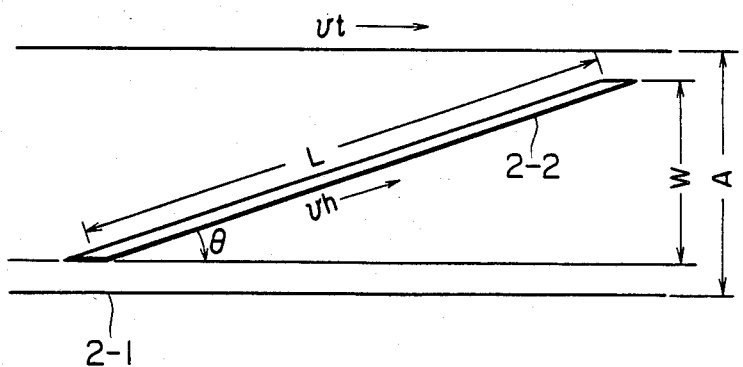
FIG. 2 is a tape format diagram for one embodiment according to the present invention.

With reference to FIG. 2, one embodiment of the present invention will be described. The reference numeral 2-1 represents a magnetic tape, 2-2 is a track, $\theta$ is a track angle, A is a tape width, W is an effective tape width, L is a track length, $V_t$ is a tape feeding speed, and $V_h$ is a relative tape speed.

Figure 3:
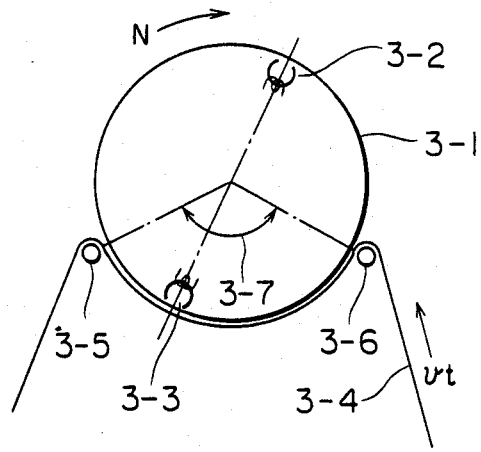
FIG. 3 is a schematic diagram illustrating a rotary head and a tape wrapped partially around the rotary head.

FIG. 3 shows a rotary head cylinder 3-1 (hereinafter referred to as a cylinder) having magnetic heads 3-2 and 3-3 disposed at substantially symmetrical positions and a magnetic tape 3-4 is wrapped partially around the cylinder 3-1 by the aid of guide posts 3-5 and 3-6 with a wrap angle 3-7. N represents a number of rotations of the cylinder 3-1, and by each head a record track as shown in FIG. 2 is produced.

Figure 4:
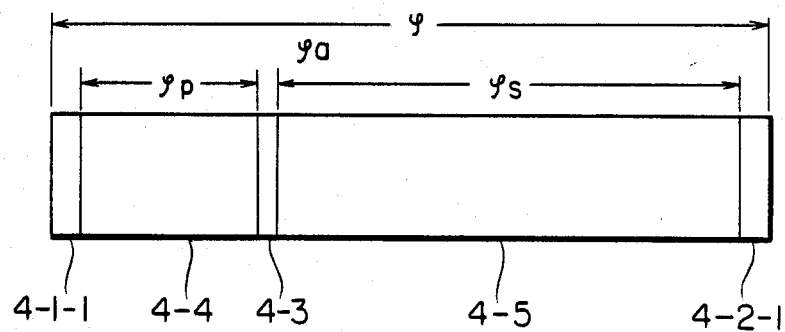
FIG. 4 is a schematic diagram of a track area arrangement of the tape format.

FIG. 4 shows an arrangement of various signal areas in the track area in which the length of each area is represented by a cylinder angle or a wrap angle, head scan angle, when the diameter $\phi$ of the cylinder 3-1 is selected at a predetermined value.

In FIG. 4, the PCM converted video information and the PCM converted audio signal are recorded respectively on an area 4-4 and an area 4-5 which are separated from each other.

The letter $\phi$ represents a whole wrap angle, $\phi_p$ and $\phi_s$ respectively represent the video information area and the audio signal area in angles. The reference numerals 4-1-1 and 4-2-1 respectively represent margin bands for the start of writing a signal and the finish of writing the signal. Further, 4-3 represents a signal non-recording band (referred to as a gap) occupying an angle $\phi_a$ and provided between the video information area 4-4 and the audio signal area 4-5.

In one aspect of the present invention, both $\phi_p$ and $\phi_s$ are set to be less than 90°.

For example, within the whole wrap angle $\phi$ of 120°, $\phi_p$ is set to be 32° and $\phi_s$ is set to be 69°.

Figure 5:
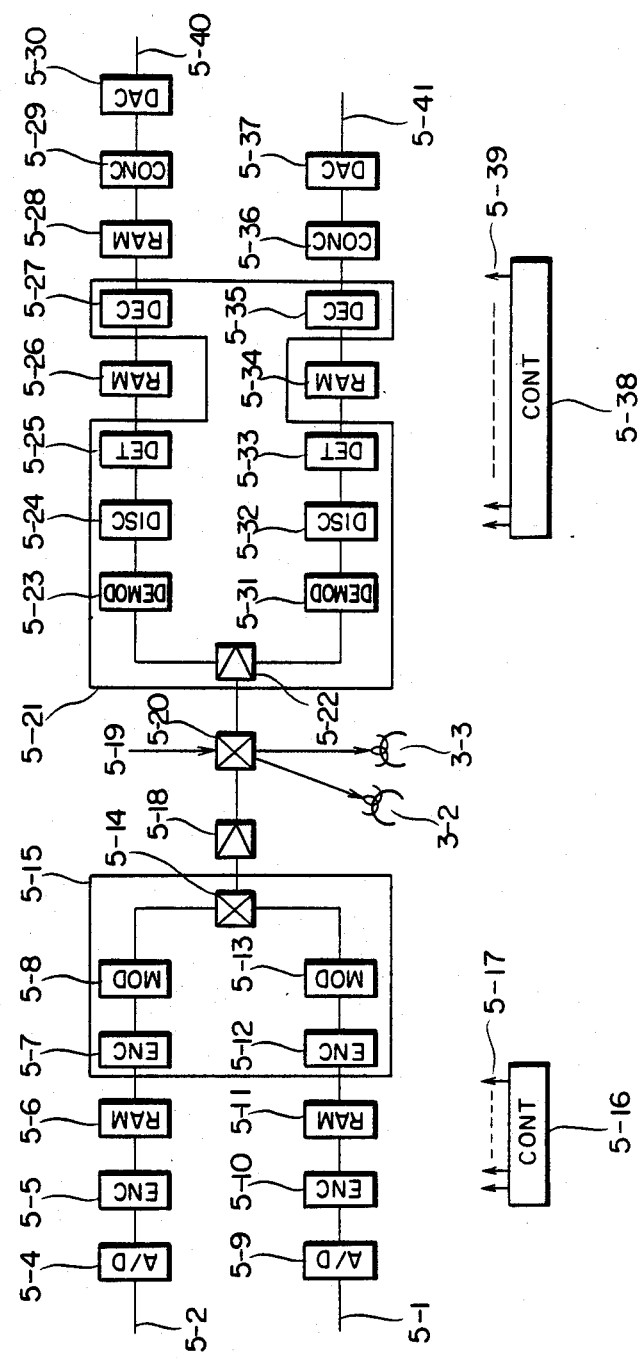
FIG. 5 is a block diagram of the recording and reproducing system of FIG. 3.

FIG. 5 illustrates a basic arrangement of a PCM recorder for an audio signal added with a video information.

An input analog audio signal 5-1 is converted to a digital signal of a predetermined bit number, e.g., 16 bits or 12 bits, in an analog-digital converting circuit 5-9. The converted digital signal is encoded in an encoding circuit 5-10 for the purpose of detecting and correcting a data error which might occur during transmission or recording and reproduction, or the like. The encoded signal is recorded in a memory 5-11 and is subject to a predetermined interleaving. The interleaved and encoded data is encoded in an encoding circuit 5-12, and at the same time a sync signal and a control signal are added. The resultant signal is modulated in a modulating circuit 5-13 as predetermined.

On the other hand, an input analog video information 5-2 is converted to a digital signal of a predetermined bit number, e.g., 8 bits, in an analog-digital converting circuit 5-4. This converted digital signal is encoded to a predetermined code, e.g., a Reed Solomon code in an encoding circuit 5-5 in order to detect and correct a data error which might be caused during transmission, or recording and reproduction.

The encoded signal is recorded in a memory 5-6, and is subject to a predetermined interleaving. The interleaved data is encoded to a predetermined code, e.g., a CRC code, in an encoding circuit 5-7 and at the same time a sync signal and a control signal are added. This resultant signal is modulated in a modulating circuit 5-8 as predetermined.

These signals from the modulating circuits 5-8 and 5-13 are alternately added in an adding circuit 5-14. The added signal is amplified in a record amplifying circuit 5-18. The amplified signal is inputted to a signal switching circuit 5-20. The switching circuit 5-20, in accordance with a control signal 5-19, supplies the output signal from the amplifying circuit 18 alternately to a head 3-2 and to a head 3-3. As a result, by each of the heads 3-2 and 3-3, a video information area 4-4 and an audio signal area 4-5 are formed on the magnetic tape and further a gap 4-3 is formed between both areas 4-4 and 4-5 as shown in FIG. 4.

In reproduction, the signal switching circuit 5-20 is controlled by the control signal 5-19 to supply the output signals from the heads 3-2 and 3-3 to a preamplifier 5-22.

The output signal from the preamplifier 5-22 is inputted to demodulating circuits 5-23 and 5-31 and demodulated therein. The demodulated signal is inputted to code discriminating circuits 5-24 and 5-32 and code discrimination is carried out. The code discriminated signals are checked in error detecting circuits 5-25 and 5-33. The checked signals are inputted to data memories 5-26 and 5-34.

In the memories, a predetermined de-interleaving is performed, and a predetermined demodulation takes place in demodulating circuits 5-27 and 5-35.

The output of the demodulating circuit 5-27 is fed to a memory 5-28. The output data from the memory 5-28 is subject to predetermined error concealment with respect to an error in data in an error concealing circuit 5-29.

The output from the concealing circuit 5-29 is converted to an analog signal 5-40 of the video information in a digital-analog converting circuit 5-30.

The output from the decoding circuit 5-35 is concealed with respect to error data as predetermined in an error concealing circuit 5-36, and then converted to an audio analog output signal 5-41 in a digital-analog converting circuit 5-37.

The operations mentioned above are controlled by control signals 5-17 and 5-39 from control circuits 5-16 and 5-38 including respectively control pulse generating circuits.

In this instance, the control circuit 5-38 is to be understood as including a detection and supplementing (or compensating) circuit of a sync signal.

Figure 6:
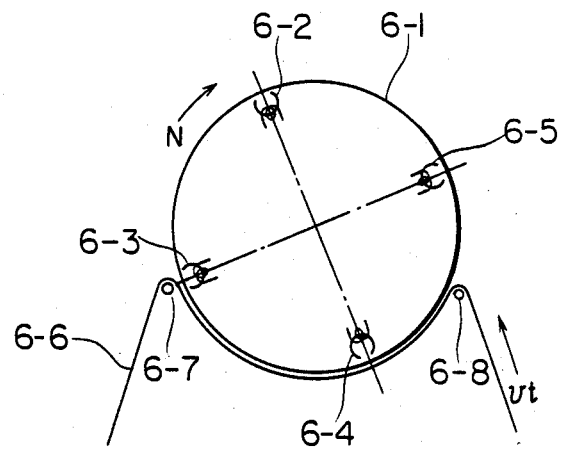
FIG. 6 is a schematic diagram illustrating a four head type rotary head and a magnetic tape partially wrapped around the rotary head.

FIG. 6 illustrates a rotary head having four magnetic heads 6-2, 6-3, 6-4 and 6-5 spaced apart at equal intervals of each 90° around the periphery of a cylinder 6-1, and a magnetic tape 6-6 is wrapped around the periphery of the cylinder 6-1 by the aid of tape guides 6-7 and 6-8. An area of the magnetic tape on which the recording is made by one magnetic head is less than 90° as is similar to the previous example shown in FIG. 4.

By the use of such magnetic heads, the after recording and the like can be achieved.

Figure 7:
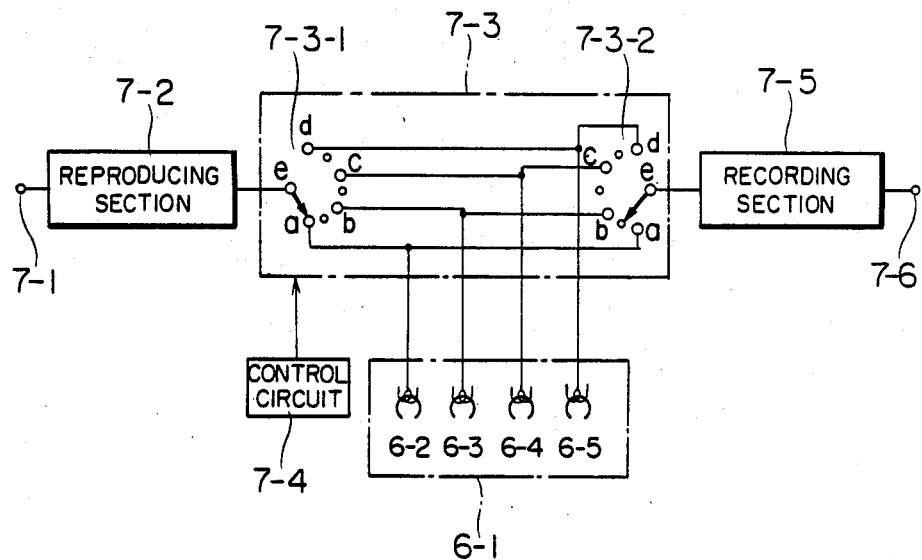
FIG. 7 is a block diagram of the recording and reproducing system of FIG. 6.

Referring to FIG. 7, the after recording will be described. In FIG. 7, the numeral 7-1 represents a reproducing section input terminal, 7-2 is a reproducing section circuit, 7-3 is a switching circuit, 7-4 is a control circuit, 7-5 is a recording section circuit, and 7-6 is a recording section output terminal. The circuit arrangement shown in FIG. 7 is applicable either to a video information and to an audio signal. The control circuit 7-4 counts a distance of one track on the magnetic tape from the wrap beginning end around the rotary head, and outputs a control signal which triggers on at a position of the gap 4-3 in FIG. 4 and which triggers off at a position of the margin band in FIG. 4. During the period between the trigger on and the trigger off by the control signal, one magnetic head 6-2 is being connected to the reproducing section circuit 7-2 and it is not connected to the recording section circuit 7-5 during this period. For the next track of the magnetic tape, switches 7-3-1 and 7-3-2 proceed one step, and the magnetic head 6-3 is connected to the recording section circuit 7-5. Then, the magnetic head 6-4 is connected to the reproducing section circuit 7-2, and subsequently the magnetic head 6-5 is connected to the recording section circuit 7-5. As a result, while the magnetic head 6-2 is performing reproduction, the recording can be made by the next magnetic head 6-3 immediately.

Further, in FIG. 7, by reversing the order of operation, that is, after the recording by the magnetic head 6-3, by reproducing the record by the next magnetic head 6-4, it is possible to check the recording condition immediately after the recording.

Next, the description will be made with regard to a format of PCM converted image information and a format of a PCM converted audio signal.

Figure 8A:
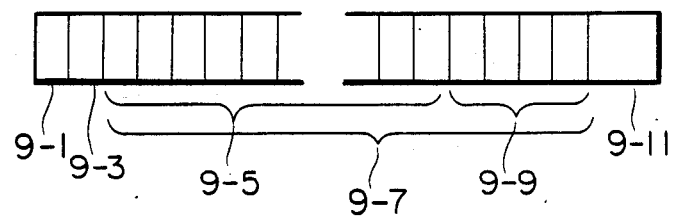
FIGS. 8A and 8B are respectively diagrams of block arrangements of video information and an audio signal.
Figure 8B:
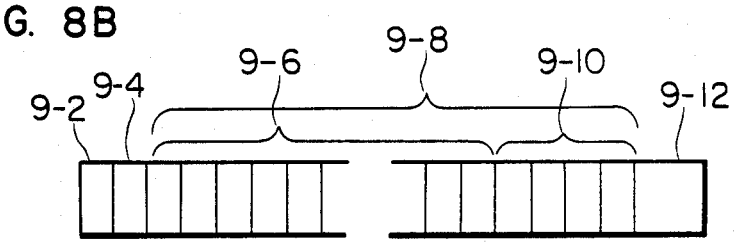

FIG. 8A illustrates an arrangement of a unit of the video information which may be called a block of information, and FIG. 8B illustrates an arrangement of a unit of the audio signal which may be called a block of information. In FIGS. 8A and 8B, numerals 9-1 and 9-2 represent sync signals, 9-3 and 9-4 are control signals, 9-7 and 9-8 are data, and in these data 9-7 and 9-8, 9-9 and 9-10 are parity data, and 9-11 and 9-12 are other parity data.

In this case;
the block lengths of the video information block and the audio signal block (FIGS. 8A and 8B) are made equal,
the sync signal patterns in 9-1 and 9-2 are equal, the bit numbers of control signals in 9-3 and 9-4 are equal,
the data numbers and bit numbers in 9-7 and 9-8 are equal, and
the parity bit numbers and the parity formation equations in 9-11 and 9-12 are made equal.

Figure 9:
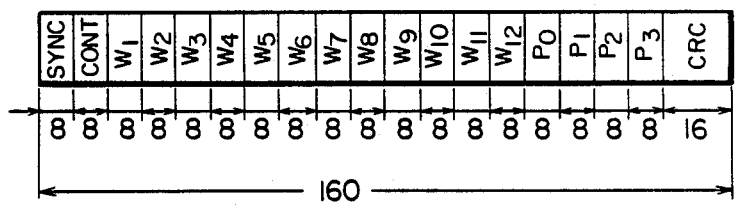
FIG. 9 is a pattern diagram of a block arrangement of a concrete embodiment of FIG. 10.

FIG. 9 shows one embodiment of more concrete block arrangement according to the present invention.

One block is constituted by 160 bits and this block consists of a sync signal pattern of 8 bits, a control signal of 8 bits, data of 8 bits in each of $W_1$ to $W_{12}$, parity data of 8 bits in each of $P_0$ to $P_3$, and a CRC code of 16 bits. These data in $W_1$ to $W_{12}$ and $P_0$ to $P_3$ are interleaved data, and the data in this example are encoded by a (16, 12) Reed Solomon code of Galois Field $G.F(2^8)$.

In this instance, each of the $W_1$ to $W_{12}$ represents, in the case of the audio signal, e.g., data formed by dividing the quantized and sampled data of 16 bits by two so that each half includes 8 bits, whereas, in the case of the video information, each of $W_1$ to $W_{12}$ represents, e.g., data for 1 dot constituted by 8 bits.

As described in the foregoing, the audio signal and the video information are formed in the same format using the same code, and by using the processing circuits on the time division basis, the circuits can be used in common and jointly.

In other words, these circuits for demodulation, code discrimination, sync signal detection and supplement (or compensation), and decoding can be used in common and jointly.

Figure 10:
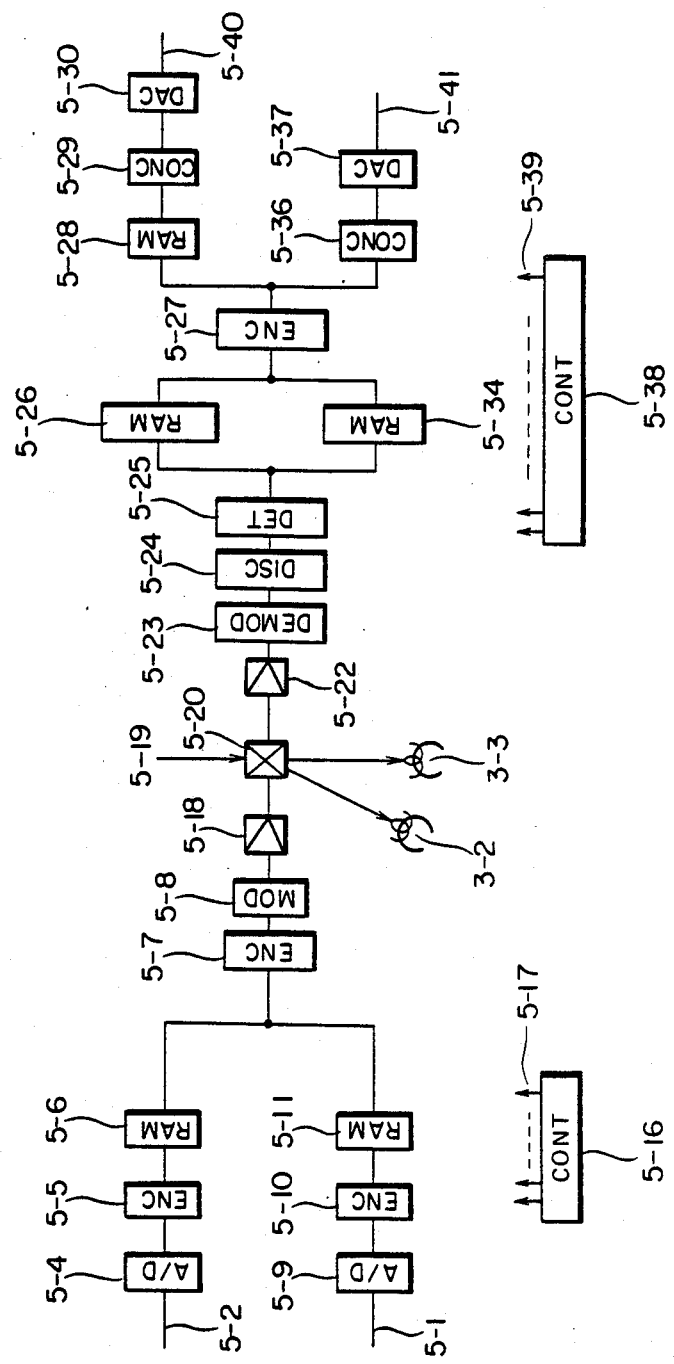
FIG. 10 is a block diagram of another embodiment of a recording and reproducing system according to the present invention.

FIG. 10 illustrates an embodiment in which some circuits are used in common for the video information processing system and for the audio signal processing system. In other words, in FIG. 10, the video information section and the audio signal section respectively shown in the frames indicated by numerals 5-15 and 5-21 in FIG. 5 are used in common, and the coding circuit 5-12, modulating circuit 5-13, demodulating circuit 5-31, code discriminating circuit 5-32, error detecting circuit 5-33 and decoding circuit 5-35 in the audio signal processing system are omitted. In FIG. 10, the outputs from memories 5-6 and 5-11 are combined under the control of a control signal 5-17 from a control circuit 5-16. Further, the inputs to memories 5-26 and 5-34 and the outputs therefrom are respectively separated and combined under the control of a control signal 5-39 from a control circuit 5-38.

Figure 11:
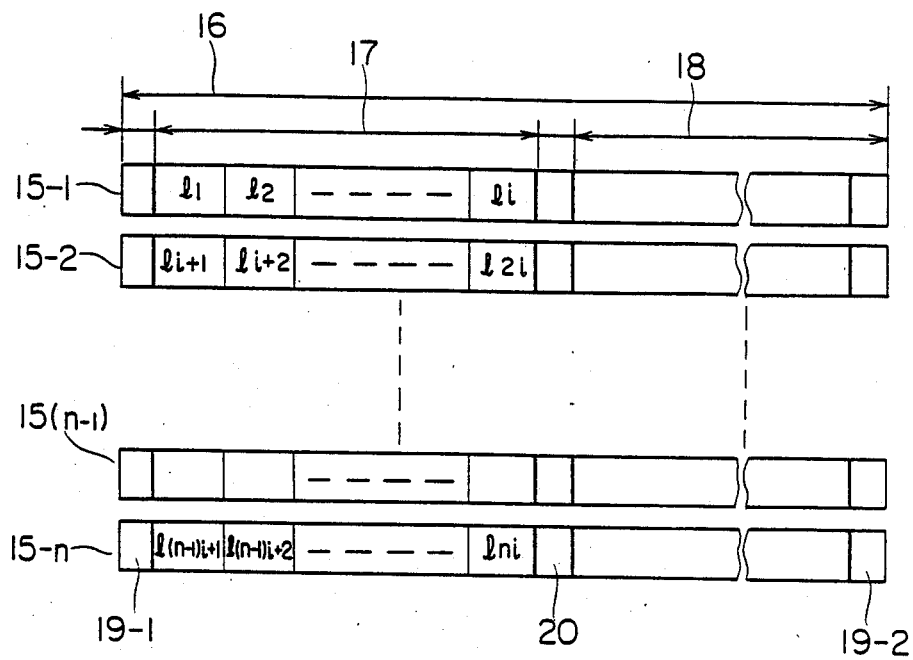
FIG. 11 is a tape format diagram for another embodiment according to the present invention.

Referring to FIG. 11, another embodiment will be described. FIG. 11 shows a tape format of a digital signal recording and reproducing apparatus of the rotary head type in which an audio signal and video information are separately recorded. The reference numerals 15-1, ... 15-n indicate recording tracks on the tape, 16 is a track length through which the magnetic head scans, 17 is an area on which the video information is recorded, 18 is an area on which the audio signal is recorded, 19-1 and 19-2 are respectively recording margin bands located at the entrance and exit sides of the tape with respect to the magnetic head, and 20 is a signal non-recording band provided for separately recording on the video information recording area 17 and the audio signal recording area 18. In this instance, for the video information, tracks 15-1 to 15-n constitute one frame or one field on the time-division basis, and on each of the tracks, information of i scanning lines is recorded with each individual scanning line recorded as a unit on $l_1, l_2, \ldots l_i$ subsequently.

FIG. 12 shows one embodiment of a line format and block format of each scanning line shown in FIG. 11. In FIG. 12 at (a), the line format of the digital component system is shown in which a luminance signal and two color difference signals of R-Y (referred to as u) and B-Y (referred to as v) of the color video signal are separately recorded. The numeral 21 indicates a recording area for the luminance signal Y, and 22 and 23 respectively indicate recording areas for the two color difference signals u and v. These signals Y, u and v are respectively sampled at jxn dots, kxn dots and lxn dots per one scanning line and then coded, and Y consists of j blocks, u consists of k blocks, and v consists of l blocks.

In FIG. 12 at (b), the block arrangement of the luminance signal Y is shown, in which the numeral 24 is a block sync signal pattern, 25 is control signal data for recording control information for a system and the like including the video information, 26 is video information data of n dots of $W_1$ to $W_n$, 27 is a word for error correction, and 28 is a word for error detection. In this case, the error correction word 27 of $P_1$ to $P_m$ is a (n+m, n) Reed Solomon code of Galois Field ($2^q$) (a represents quantized bit number of each dot) which is added by using the video information data of $W_1$ to $W_n$.

By virtue of the arrangement described above, even when a data error occurs due to drop-out of a track as a unit, an interpolation processing can be made with data per scanning line and hence the level of reproduced picture quality is stabilized. Further, assuming that the number of sampling points per one scanning is the same for both 525/60 system and 625/50 system, the video feeding capability is determined by the ratio between the numbers of effective scanning lines recorded in both systems, and thus the interchangeability can be obtained without changing the format for recording.

FIG. 13 is a block diagram of a recording system. Color signals R, G and B from a color camera 5-41 are converted to digital component codes Y, U and V by a digital encoder 5-42. In this digital encoder 5-42, the color signals R, G and B are respectively converted to digital signals R', G' and B' by analog-digital converters 5-43, 5-44 and 5-45 in accordance with a predetermined sampling period and quantization bit number. Then, a digital component encoding circuit 5-46 receives these digital signals R', G' and B' and converts them to the digital component signals Y, U and V. These digital component signals Y, U and V are recorded in a frame memory 5-47. The digital component signals for one complete picture recorded in the frame memory 5-42 in this manner are sequentially read out in blocks of a plurality of lines or n scanning lines (n; a positive integer) and encoded in a primary encoding circuit 5-5, and recorded in a memory 5-6 for a short while. The data in this memory 5-6 is read out in a predetermined order and encoded in a secondary encoding circuit 5-7. Like members in FIG. 13 as in FIG. 10 are indicated by like reference numerals.

As described in the foregoing, in the present invention, a recording area is divided into one for the video information and one for the audio signal, and both divided recording areas for the video information and the audio signal are made to have a wrap angle less than 90° under a predetermined size of the cylinder diameter. As a result, there is the advantage that the after recording can be performed which enables to start recording while the reproducing is still in progress, and further the recording condition can be checked instantly during the recording.

Furthermore, in the present invention, the signal format of the video information is made common to the signal format of the audio signal, and some of the circuits for processing the signals for the divided areas are used by switching alternately on the time-division basis, and hence the circuits can be used in common and jointly.

In addition, by recording the information in the video information recording area frame by frame or field by field on the time-division basis and by recording one to several scanning lines per one track, even when a data error is caused due to drop-out of signals of one or more tracks, the interpolation processing of data can be achieved on the basis of the scanning line information of the preceding or succeeding track. Further, since the number of sampling points in one scanning line is made the same in the 525/60 system and in the 625/50 system by empolying the digital component system, the capability of reproducing the video information is determined by the ratio between the numbers of effective scanning lines recorded in both systems. As a result, without changing the format, the interchangeability can be obtained between the 525/60 and 625/50 systems.

What is claimed is:

1. A rotary head type PCM recorder comprising:
   rotary head means for at least one of recording and reproducing first and second PCM converted signals on a magnetic tape on which a plurality of slant parallel tracks are to be formed; and
   recording circuit means for sequentially recording a PCM converted audio signal and a PCM converted video signal as said first and second PCM converted signals on first and second areas of any one slant track, respectively, said first and second areas of any one slant track being separate from each other and occupying a substantial part of said one slant track without overlap, each of said first and second areas having a length corresponding to a head scan angle of less than 90° such that said first and second areas are recorded on said magnetic tape having a wrap angle sufficient to enable at least one of signal recording and reproducing on the entirety of said one slant track.

2. A rotary head type PCM recorder according to claim 1, wherein each of said PCM converted audio and video signals are recorded by said recording circuit means in blocks, each block including a sync signal pattern, record data and an error detection and correction code, at least one of the length of the block, the sync pattern and the error detection and correction code of said PCM converted audio signal being identical with that of said PCM converted video signal.

3. A rotary head type PCM recorder according to claim 1, wherein said recording circuit means includes recording means for recording said video signal on said second area in a time-division fashion in the unit of a frame.

4. A rotary head type PCM recorder according to claim 1, wherein said recording circuit means includes recording means for recording said video signal on said second area in a time-division fashion in the unit of a positive integer times the scanning line.

5. A rotary head type PCM recorder according to claim 4, wherein said video signal includes digital components of a luminance signal and color difference signals.

6. A rotary head type PCM recorder according to claim 1, wherein said rotary head means has at least two magnetic heads disposed on the periphery thereof at an interval of 180°, and said first and second PCM converted signals are recorded on said magnetic tape by said two magnetic heads.

7. A rotary head type PCM recorder according to claim 1, wherein said rotary head means has four magnetic heads disposed on the periphery thereof respectively, at intervals of 90°, and one of said first and second PCM converted signals is reproduced by two magnetic heads opposed to each other at an interval of 180° and the remaining two magnetic heads are utilized to record the other of said first and second PCM converted signals.

* * * * *